(12) United States Patent
Cote et al.

(10) Patent No.: US 10,671,995 B1
(45) Date of Patent: Jun. 2, 2020

(54) PAYMENT CARD WITH BUDGET DISPLAY

(71) Applicant: Wells Fargo Bank, N.A., San Francisco, CA (US)

(72) Inventors: Caroline S. Cote, Tega Cay, SC (US); James R. Seeley, Charlotte, NC (US); Chad Allen Yarbrough, St. Louis, MO (US); Robin A. Leavitt, Charlotte, NC (US); Christine E. Skatchke, Cedarburg, WI (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 15/809,504

(22) Filed: Nov. 10, 2017

(51) Int. Cl.
| | |
|---|---|
| *G06K 5/00* | (2006.01) |
| *G06Q 20/34* | (2012.01) |
| *G06Q 20/40* | (2012.01) |
| *G06K 19/06* | (2006.01) |
| *G06K 19/077* | (2006.01) |

(52) U.S. Cl.
CPC ..... *G06Q 20/341* (2013.01); *G06K 19/06187* (2013.01); *G06K 19/07707* (2013.01); *G06Q 20/403* (2013.01)

(58) Field of Classification Search
CPC . G07F 7/1008; G06Q 20/341; G06Q 20/3433
USPC ................. 235/380, 382, 487, 492
See application file for complete search history.

(56) References Cited

U.S. PATENT DOCUMENTS

| | | | |
|---|---|---|---|
| 5,788,405 A | 8/1998 | Beard | |
| 6,105,865 A | 8/2000 | Hardesty | |
| 8,260,699 B2 | 9/2012 | Smith | |
| 8,364,518 B1 | 1/2013 | Blake et al. | |
| 8,622,309 B1 * | 1/2014 | Mullen | G06Q 20/347 235/492 |
| 2009/0048957 A1 | 2/2009 | Celano | |
| 2012/0215724 A1 * | 8/2012 | Ross | G06Q 30/00 705/400 |
| 2012/0233015 A1 * | 9/2012 | Calman | G06Q 30/0633 705/26.8 |
| 2012/0278148 A1 | 11/2012 | Clemmons | |
| 2013/0041819 A1 | 2/2013 | Khasho | |

(Continued)

OTHER PUBLICATIONS

"MasterCard Introduces Next Generation 'Display Card' Technology, a first for Singapore", Press Releases, [Online]. [Accessed Oct. 25, 2018]. Retrieved from the Internet: <URL: https://newsroom.mastercard.com/press-releases/mastercard-introduces-next-generation-display-card-technology-a-first-for-singapore/). >, (Nov. 7, 2012), 3 pgs.

*Primary Examiner* — Daniel St Cyr
(74) *Attorney, Agent, or Firm* — Schwegman Lundberg & Woessner, P.A.

(57) ABSTRACT

Various examples are directed to payment cards with budget displays including systems and methods for using the same. A payment card may comprise a display and a control circuit. The control circuit may display, at the display of the payment card, a first display state indicating a first unused portion of a budget amount for a current budget period. The control circuit may access first budget status data generated in response to a transaction made with the payment card and modify the display to display a second display state indicating a second unused portion of the budget amount for the current budget period, wherein the second unused portion is based at least in part on the transaction.

18 Claims, 12 Drawing Sheets

(56) References Cited

U.S. PATENT DOCUMENTS

| | | | |
|---|---|---|---|
| 2013/0226609 A1* | 8/2013 | Pourfallah | G06Q 20/347 705/2 |
| 2014/0279476 A1* | 9/2014 | Hua | G06Q 20/227 705/41 |
| 2015/0073952 A1 | 3/2015 | Ventura et al. | |
| 2015/0149386 A1 | 5/2015 | Khodavardad | |
| 2016/0027102 A1 | 1/2016 | Smith et al. | |
| 2016/0078559 A1 | 3/2016 | Ventura | |
| 2016/0321663 A1* | 11/2016 | Batlle | G06Q 20/409 |

* cited by examiner

PAYMENT CARD WITH BUDGET DISPLAY

TECHNICAL FIELD

Embodiments described herein generally relate to payment cards for interfacing with users, systems including payment cards for interfacing with users, and methods for interfacing payment cards to users.

BACKGROUND

Budgeting can be a challenging proposition for many people. Even for those who are able to budget, keeping track of spending and comparing the spending to the budget can involve complex interactions with paper records, online portals, etc.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DETAILED DESCRIPTION

Figure 1:
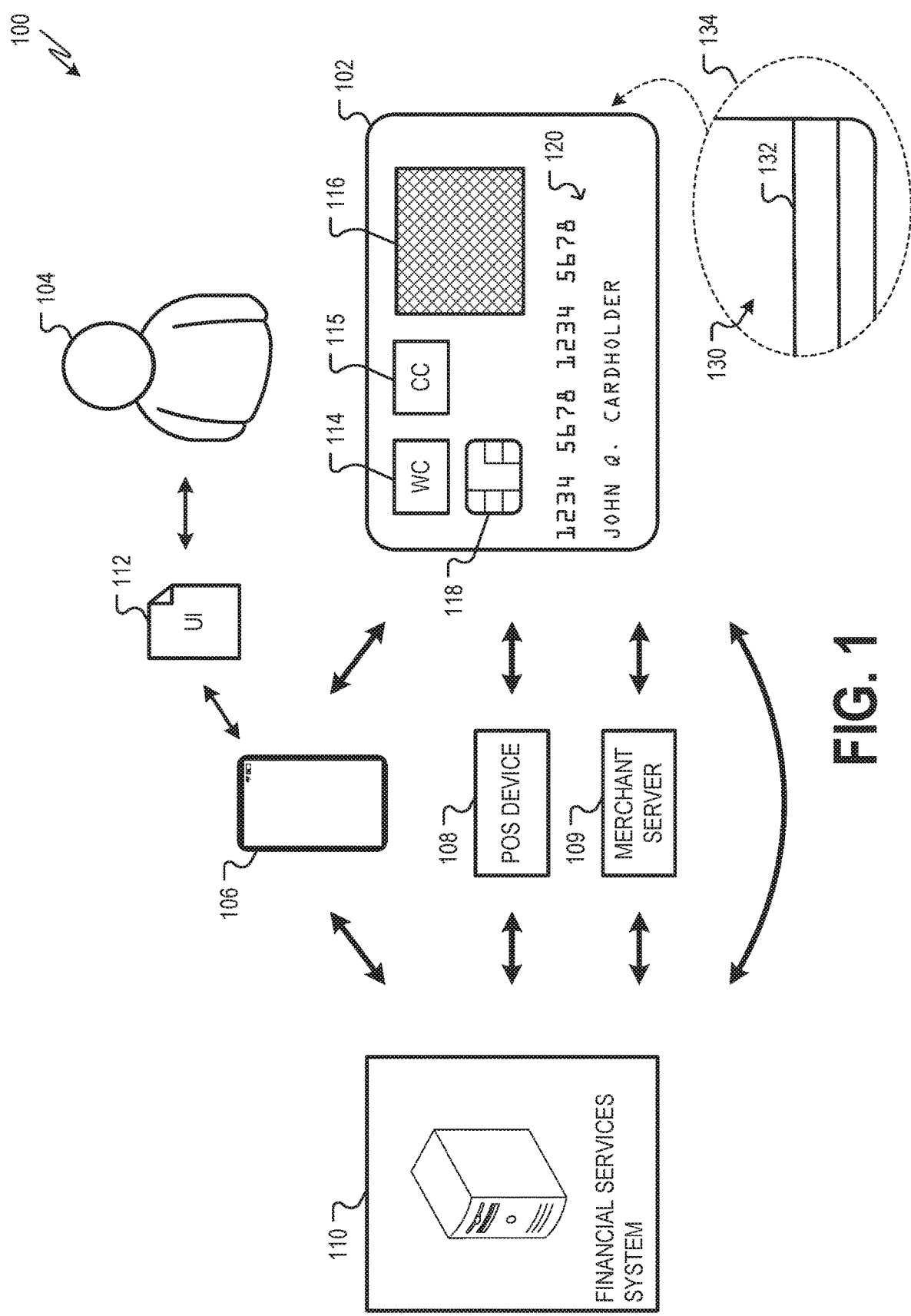
FIG. 1 is a diagram showing one example of an environment for implementing a payment card with a display.

Various examples are directed to payment cards for interfacing with users, systems including payment cards for interfacing with users, and methods for interfacing payment cards to users. The payment card may be a credit card, a debit card, or any other card used for making payments. The payment card may be a card made from plastic or another suitable material and having a device, such as a magnetic strip or chip, for storing account information that can be used to make a payment from the referenced account. The payment card comprises a display and a control circuit.

The control circuit modifies the display to indicate a budget status to the user. The budget status may indicate, for example, an unused portion of a user budget for a current budget period. The user (or other suitable source) provides a budget that indicates a budget amount for each budget period. Budget periods may include months, weeks, days, etc. When the user makes a transaction with the payment card, the control circuit of the payment card generates and/or is provided with budget state data. The budget state data may indicate, for example, an amount that the user has spent during the current budget period. Based on the budget state data, the control circuit for the payment card modifies the display from a first display state to a second display state. In the second display state, the payment card indicates the unused portion of the budget amount for the current budget period. This may provide the user with an indication of how much the user has already spent during the budget period and/or how much the user has yet to spend during the budget period according to the budget.

In various examples, the payment card, systems, and methods described herein may be used by a customer of a financial institution. The display on the payment card may be visible each time the user makes a transaction with the payment card. In this way, the user may be reminded of the budget and the unused portion of the budget amount for the current budget period each time that the payment card is used, which may help the user better plan spending so as to meet the budget. For example, the user may consider making an impulse buy or other non-essential purchase that cannot be easily fit in the budget. After seeing the state of the user's budget on the payment card display, the user may decline to complete the transaction and/or put off the transaction until another budget period.

The display state may indicate the unused portion of the budget amount in any suitable manner. In some examples, the display may be capable of indicating a color. For example, all or substantially all of the display, or all or substantially all of a designated portion of the display, may be programmable by the control circuit to assume a particular color. The color of the display or display portion may indicate to the user the unused portion of the budget amount for the current budget period. In one example, if the unused portion of the budget amount is greater than a threshold amount, the display or display portion displays green. If the unused portion of the budget amount is less than the threshold amount, the display or display portion displays yellow. If the budget amount is met or exceeded, the display or display portion may display red. In some examples, intermediate thresholds may be used. For example, the display or display portion may display different colors or color shades based on gradations of the budget amount that remain unused.

In other examples, the display may include different shapes, where the relative sizes of the shapes indicate the unused portion of the budget amount. For example, the display may include a bar graph, where a "bar" of the bar graph is a first shape. A second shape may include another "bar" of the bar graph and/or a remainder of the bar graph.

FIG. 1 is a diagram showing one example of an environment 100 for implementing a payment card 102 with a display 116. The environment 100 includes the payment card 102 and a financial services system 110. Optionally, the environment 100 may also include a user computing device 106, a point-of-sale (POS) device 108, and/or a merchant server 109.

The payment card 102 includes card information 120 that may be printed and/or embossed on the surface of the payment card 102. Example card information 120 includes a card number, a cardholder (e.g., user) name, etc. The display 116 is configurable by a control circuit 115. The display 116 may include any suitable type of display including, for example, a liquid crystal display (LCD), a light-emitting diode (LED) display, etc. The control circuit 115 may be or include any suitable control hardware including, for example, a microcontroller or other processor unit, a state machine, etc.

The payment card 102 may include one or more communication adaptors for sending and/or receiving data, for example, budget status data, transaction data, etc. In some examples, the payment card 102 includes a Europay Mastercard Visa (EMV) chip 118. The EMV chip 118 may be compatible with EMV chip readers in many point-of-sale (POS) devices, such as the POS device 108. In this way, the EMV chip 118 may enable the control circuit 115 to communicate with the PUS device 108, for example, as described herein. In some examples, the control circuit 115 may be implemented with hardware of the EMV chip 118. In another example, the EMV chip 118 may be in communication with the control circuit 115 to permit the control circuit 115 to communicate, for example, with the PUS device 108. In some examples, the payment card 102 includes a magnetic strip 132 (shown on a back side 130 of the payment card 102 illustrated at a window 134). The magnetic strip 132 may have data encoded therein that is readable by a POS device 108 including a magnetic strip reader.

In some examples, the payment card 102 includes a wireless communication adapter 114 in communication with the control circuit 115. The wireless communication adapter 114 may permit the control circuit 115 to communicate with various other components of the environment 100 including, for example, the user computing device 106, the PUS device 108, the merchant server 109, and/or the financial services system 110. The wireless communication adapter 114 may support any suitable wireless communication protocol. In some examples, the wireless communication adapter 114 supports inductive and/or capacitive wireless communications, for example, similar to a Radio Frequency Identification (RFID) device. Another device, such as the PUS device 108, may include a reader component that radiates the wireless communication adapter 114 with electromagnetic energy. The electromagnetic energy may be coupled (e.g., inductively and/or capacitively) to the wireless communication adapter 114, causing the wireless communication adapter 114 to wirelessly transmit data to the reader component. Some or all of the components of the payment card 102 may be powered by electromagnetic energy received from the reader component. In some examples, the wireless communication adapter 114 supports a short-range communication protocol such as, for example, Bluetooth®, Near Field Communications (NFC), etc. In some examples, the wireless communication adapter 114 supports wireless communication according to an IEEE 802.11 specification, such as Wi-Fi.

The financial services system 110 may administer an account associated with the payment card 102 for funding transactions made using the payment card 102. The account may be a credit account, a demand deposit account, a pre-paid account, or any other suitable type of account. The financial services system 110 may be or include any suitable type of computing device or devices including, for example, one or more servers. One or more computing devices of the financial services system 110 may be co-located at a single location and/or may be distributed across multiple locations. The financial services system 110 may be in communication with the payment card 102 directly, for example, via the wireless communication adapter 114, and/or indirectly, for example, via the POS device 108, merchant server 109, and/or user computing device 106.

The user computing device 106 may be or include any suitable computing device or devices having at least one processor unit and associated memory. For example, the user computing device 106 may include one or more mobile telephones, wearables, smart speaker devices, tablet computers, laptop computers, desktop computers, etc. The user computing device 106 may perform various functions in the environment 100. In some examples, the user computing device 106 is programmed to be a communications interface between the payment card 102 and one or more other components of the environment 100 such as, for example, the financial services system 110. For example, the user computing device 106 may communicate with the control circuit 115 of the payment card 102 via a short-range communications medium, such as Bluetooth®, Bluetooth® LE, NFC, etc., and relay messages to the financial services system 110 or another component of the environment 100 via an IEEE 802.11 protocol.

Also, in some examples, the user computing device 106 is programmed to provide a user interface 112 to a user 104. The user interface 112 may provide the user 104 with functionality for configuring the payment card 102. For example, the user 104 may provide user budget data describing a user budget that is to be monitored with the payment card 102. For example, the user 104 may provide an indication of what the budget period will be (e.g., one week, one month, etc.), an indication of a budget amount for one or more budget periods, etc. In some examples, the user interface 112 may provide additional functionality. For example, the user computing device 106 may receive via the user interface 112 financial data describing the user 104 such as, for example, a periodic income, a balance of a retirement or savings account, data describing one or more financial goals, etc. From this, the user computing device 106 may determine a suggested budget amount for one or more budget periods.

The POS device 108 may be or include any suitable device associated with a merchant or online store that accepts a payment from the payment card 102. The POS device 108 may comprise one or more processor units and various other computing components. In some examples, the POS device 108 may be or comprise a computing device configured, for example, according to one or more of the hardware or software architectures described herein. The POS device 108 may be configured to communicate with the payment card 102 using any suitable contact or a contactless medium. For example, the POS device 108 may communicate with the payment card 102 via the magnetic strip 132 of the payment card 102 (e.g., via a magnetic strip reader). In some examples, the POS device 108 may be configured to communicate with the payment card 102 utilizing a short-range communication medium, as described herein.

The merchant server 109 may be or include any suitable computing device or devices. The merchant server 109 may communicate directly with the payment card 102 (e.g., the control circuit 115 thereof) via the wireless communication adapter 114. In some examples, the merchant server 109 may also communicate with the payment card 102 indirectly, e.g., via the POS device 108 or the user computing device 106. In some examples, the user 104 may enter information from the payment card 102 into a web interface hosted by the merchant server 109, permitting the user 104 to initiate a transaction with the payment card 102 without the merchant server 109 communicating with the payment card 102.

The POS device 108, merchant server 109, and/or user computing device 106 may be in communication with the financial services system 110, for example, in connection with transactions initiated with the payment card 102. For example, when the user 104 initiates a transaction with a merchant via the POS device 108 and/or merchant server 109, the POS device 108 and/or merchant server 109 may communicate with the financial services system 110 to inquire about whether there are sufficient funds to cover the transaction in the account associated with the payment card 102 and/or to initiate a payment from the account to cover the transaction.

The display 116 of the payment card 102, as described herein, may provide an indication of an unused portion of a budget amount, for example, for a current budget period. The unused portion may include portions of the budget amount for a budget period (e.g., the current budget period) that have not yet been spent and/or allocated. Portions of the budget amount that have been spent include money or other value that was used to cover payments from previous transactions. Portions of the budget amount that have been allocated include money or other value that is for use to cover a planned future transaction. For example, when the budget period is a month, the user's car payment may be due near the end of the month. The amount of the car payment may be allocated throughout the month so that it is not reflected in the unused portion of the budget amount.

The control circuit 115 may configure the display 116 to indicate the unused portion of the budget amount. The display 116 may indicate the unused portion of the budget amount, for example, by showing a color corresponding to the unused portion at all or substantially all of the display 116 and/or a portion of the display 116. Any suitable colors may be used. For example, when the unused portion of the budget amount is greater than a first threshold, then the display 116 may show a first color. When the unused portion of the budget amount is less than the first threshold, then the display 116 may show a second color. In some examples, more than two colors are used. For example, the second color may be displayed when the unused portion of the budget amount is less than the second threshold and greater than a third threshold. When the unused portion of the budget amount is less than the third threshold, a third color may be displayed. In some examples, the first color is green, the second color is yellow, and the third color is red.

The control circuit 115 may be programmed to change a state of the display 116 from one display state to another after a transaction. For example, the control circuit 115 may access budget status data generated in response to a transaction made with the payment card 102. The budget status data may be generated by the control circuit 115 and/or receive from another system. The budget status data may be accessed from a memory storage location accessible to the control circuit 115 such as, for example, a volatile or non-volatile memory including, for example, a RAM, a register, such as of a processor, etc. The budget status data may indicate, for example, the unused portion of the budget amount in view of the transaction. In some examples, the budget status data is generated by the control circuit 115. For example, the control circuit 115 may include memory or other data storage for storing transaction data describing transactions made using the payment card 102. The control circuit 115 may deduct a current transaction amount from the previous unused portion of the budget amount to generate some or all of the budget status data. The result may be stored at the memory or other data storage of the control circuit 115 and accessed from the memory or other data storage for updating the display 116. In another example, the budget status data is generated by another computing device such as, for example, the financial services system 110 or user computing device 106. The payment card 102 may access the budget status data from a communication provided to the payment card 102 by the user computing device 106 and/or financial services system 110.

Because the transaction spends some portion of the budget amount, the unused portion may be smaller after the transaction than it was before the transaction. In some examples, the transaction may change the unused portion of the budget amount sufficiently to prompt a change in the display state of the display 116. Accordingly, the control circuit 115 may modify the display 116 to a second display state. For example, the control circuit 115 may modify the display 116 from displaying a first color (e.g., green, yellow, etc.) to a second color yellow, red, etc.).

Figure 2:
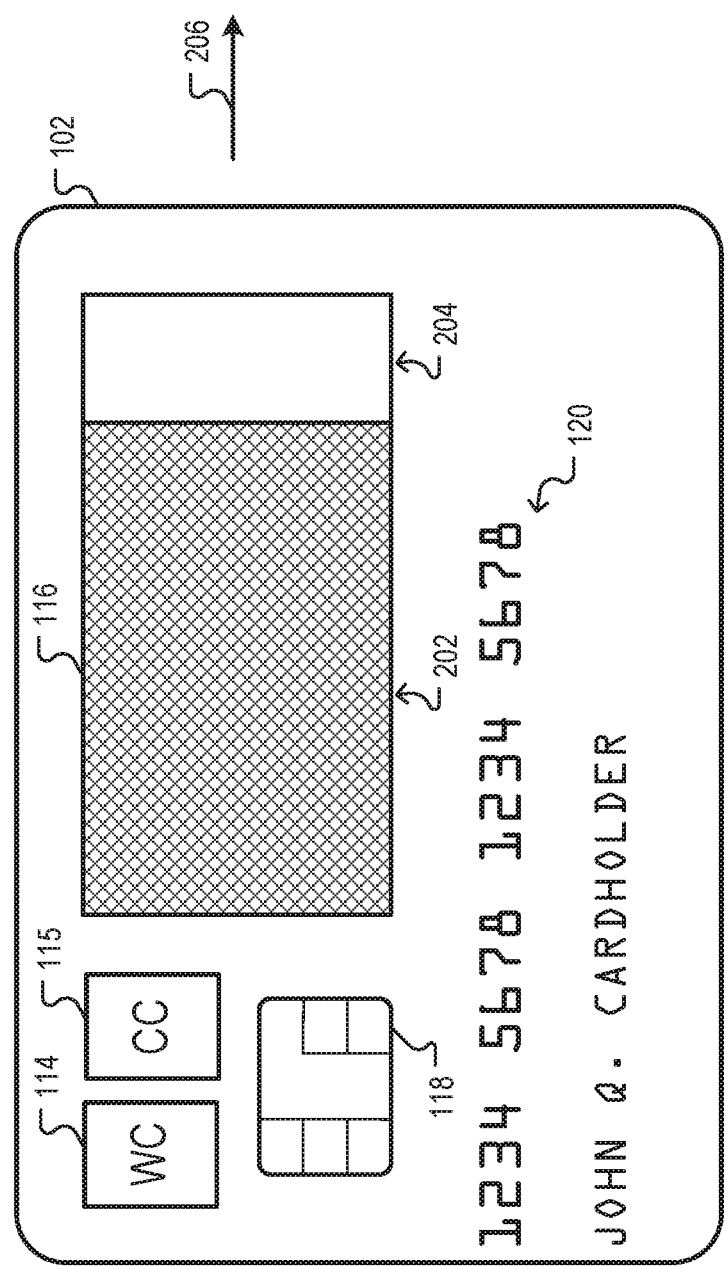
FIG. 2 shows another example of the payment card of FIG. 1 including another example configuration for the display.

FIG. 2 shows another example of the payment card 102 including another example configuration for the display 116. In the example of FIG. 2, the control circuit 115 has configured the display 116 to a display state that includes a bounding shape 204 and a budget status shape 202. The portion of the bounding shape 204 that is taken up by the budget status shape 202 may indicate the portion of the budget amount that is used. The portion of the bounding shape 204 that is not taken up by the budget status shape 202 may indicate the unused portion of the budget amount. As the budget amount for the current budget period is consumed, the budget status shape 202 may become larger, indicating a smaller unused portion of the budget amount. In some examples, the budget status shape 202 becomes larger by growing in a single dimension as the used portion of the budget amount grows. In the example of FIG. 2, the budget status shape 202 may grow from left to right as indicated by an arrow 206.

In some examples, the colors of the shapes 202, 204 are selected to also indicate the used and/or unused portion of the budget amount. For example, the budget status shape 202 and/or the bounding shape 204 may be displayed in different colors depending on the unused portion of the budget amount, for example, as described above.

Figure 3:
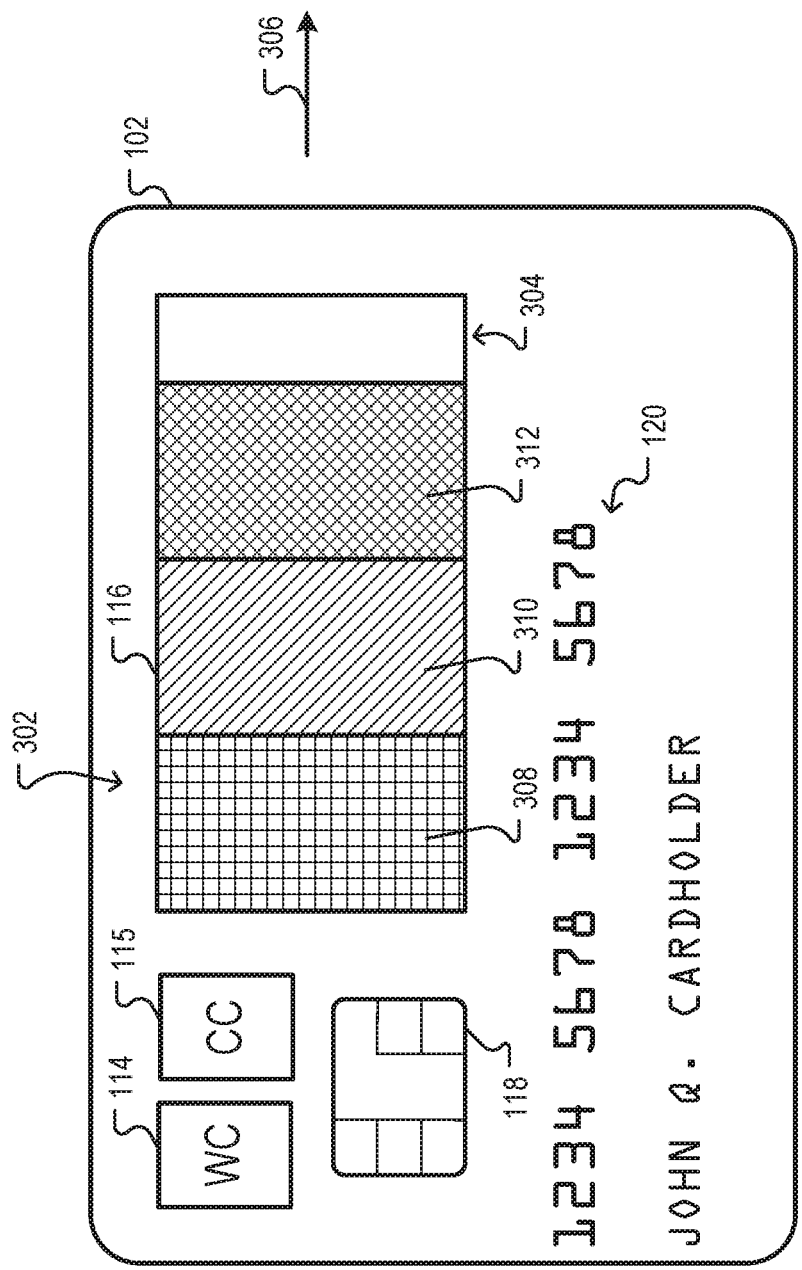
FIG. 3 shows another example of the payment card of FIG. 1 including another example configuration for the display.

FIG. 3 shows another example of the payment card 102 including another example configuration for the display 116. In the configuration shown in FIG. 3, the display 116 shows a budget status shape 302 and a bounding shape 304 as described with respect to FIG. 2. In FIG. 3, however, the budget status shape 302 is divided into shape portions 308, 310, 312, which may have different colors. The shape portions 308, 310, 312 may be adjacent to one another in the dimension indicated by an arrow 306, as shown.

In some examples, the shape portions 308, 310, 312 may appear sequentially. In the example of FIG. 3, the budget status shape 302 expands in the direction indicated by the arrow 306 as more of the budget amount is spent. The shape portion 308 may appear first. The shape portion 308 may be displayed in a color that indicates a small used and/or large unused portion of the budget amount such as, for example, green. As more of the budget amount is spent or allocated, the shape portion 308 may grow from left to right, as indicated by the arrow 306. When the user 104 has spent and/or allocated more than a first threshold of the budget amount, the first shape portion 308 may not grow further, but the second shape portion 310 may appear and continue to grow in the direction of the arrow 306 as more of the budget amount is spent or allocated. The second shape portion 310, in some examples, has a color different from the color of the first shape portion 308. For example, if the first shape portion 308 is red, the shape portion 310 may be yellow or another color indicating that more of the budget amount is used. When the used portion of the budget amount exceeds a second threshold, the shape portion 310 may not grow further, but the third shape portion 312 may appear and continue to grow in the direction of the arrow 306 as more of the budget amount is spent. In some examples, the shape portion 312 has a third color indicating that more of the budget amount is used such as, for example, orange or red.

Figure 4:
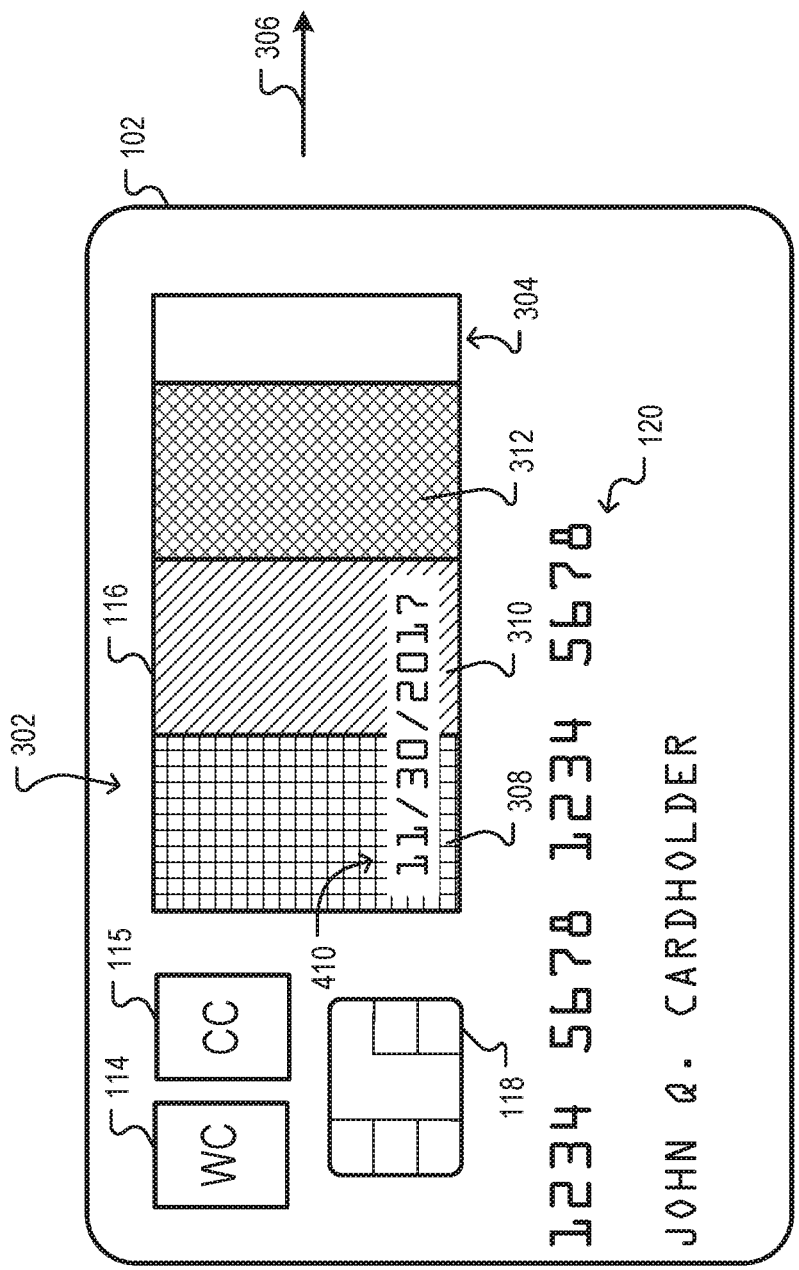
FIG. 4 shows another example of the payment card of FIG. 1 with the display configured to display an end of the current budget period.

FIG. 4 shows another example of the payment card 102 of FIG. 1 with the display 116 configured to display a date indicator 410 indicating an end of the current budget period. This may provide the user 104 with an indication of how much time is left before the next budget period and how long the unused portion of the budget amount may need to last.

Figure 5:
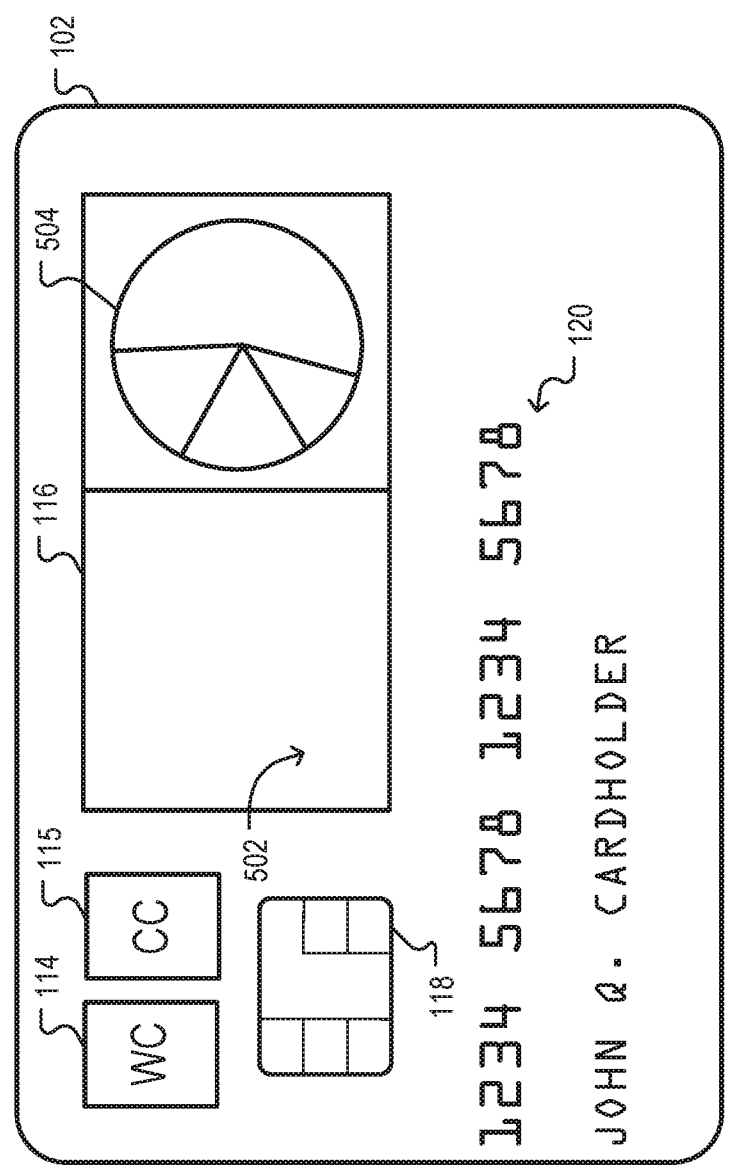
FIG. 5 shows another example of the payment card of FIG. 1 with an expense category indicator shown at the display.

FIG. 5 shows another example of the payment card 102 of FIG. 1 with an expense category indicator 504 shown at the display 116. The expense category indicator 504 is shown as a pie chart where different portions of the pie chart indicate amounts for transactions in different expense categories. Any suitable expense categories may be used such as, for example, housing, utilities, auto, etc. Although a pie chart is shown in FIG. 5, different examples of the expense category indicator 504 may take different forms (e.g., a bar chart, etc. A remainder portion 502 of the display 116 in the configuration of FIG. 5 may indicate the used and/or unused portion of the budget amount for the current budget period. For example, the remainder portion 502 of the display 116 may be configured in a manner similar to the way that the display 116 as a whole is configured in FIGS. 1-4.

Figure 6:
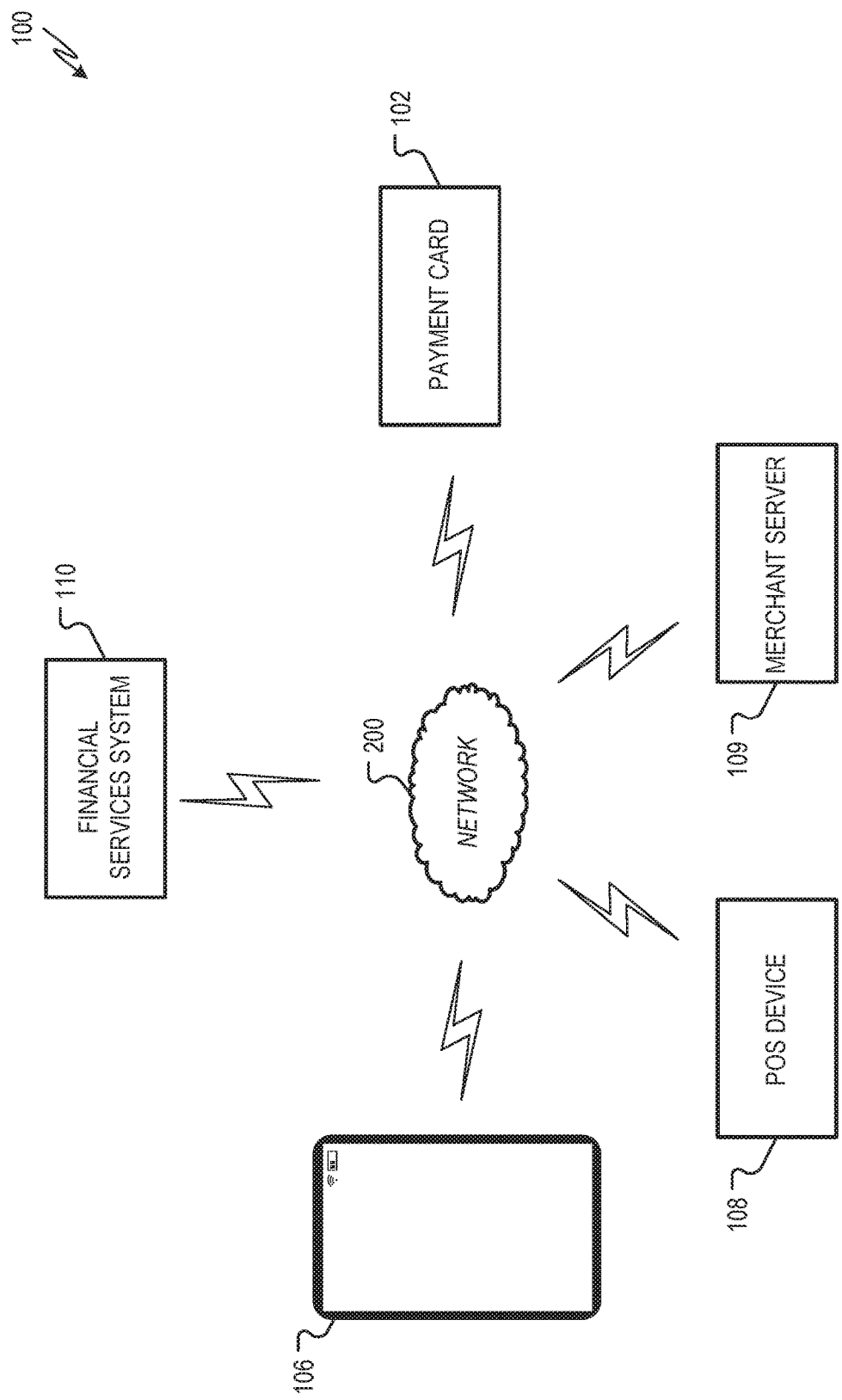
FIG. 6 is a diagram showing another example of the environment of FIG. 1 including additional details.

FIG. 6 is a diagram showing another example of the environment 100 including additional details. In the example of FIG. 6, the payment card 102, the financial services system 110, the POS device 108, the merchant server 109, and the user computing device 106 are in communication with one another via a network 200. The network 200 may be or comprise any suitable network element operated according to any suitable network protocol. For example, one or more portions of the network 200 may be an ad hoc network, an intranet, an extranet, a virtual private network (VPN), a local-area network (LAN), a wireless LAN (WLAN), a wide-area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, another type of network, or a combination of two or more such networks.

Figure 7:
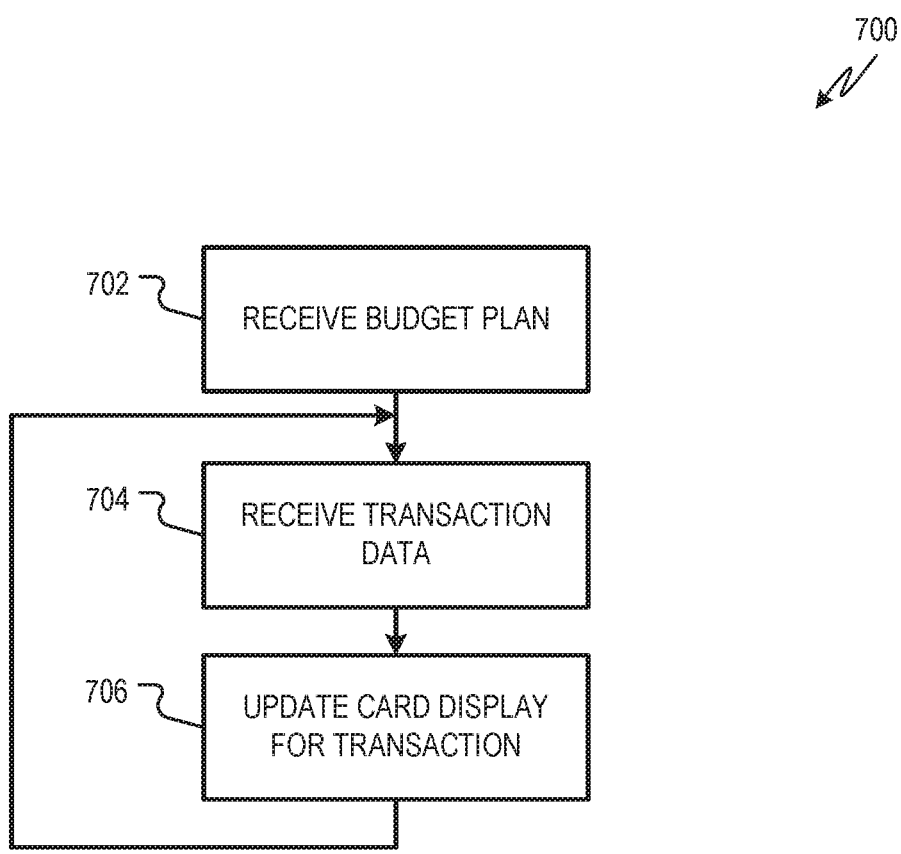
FIG. 7 is a flowchart showing one example of a process flow that may be executed in the environment of FIG. 1 to implement the payment card with budget display.

FIG. 7 is a flowchart showing one example of a process flow 700 that may be executed in the environment 100 to implement the payment card 102 with budget display. At operation 702, the payment card 102 (e.g., the control circuit 115 thereof) may receive budget plan data from the user 104 describing a budget. The budget plan data may be received, for example, via the user interface 112 provide by the user computing device 106. The user computing device 106 may provide the budget plan data to the payment card 102, which may store the budget plan data at a memory or other data storage. At operation 704, the payment card 102 may receive transaction data describing a transaction made with the payment card 102. The transaction data may be received, for example, from the financial services system 110, the POS device 108, the merchant server 109, or another suitable component. For example, the transaction may draw a payment from an account associated with the payment card 102. At operation 706, the payment card 102 may update the display 116 from a first display state to a second display state, for example, based on the transaction. In some examples, the operations 704 and 706 are repeated again for subsequent transactions, for example, as illustrated in FIG. 7.

The process flow 700 is described above as being executed by the payment card 102 (e.g., the control circuit 115 thereof). In various examples, however, the process flow 700 may be executed wholly or partially by other components of the environment 100. In some examples, the user computing device 106 may execute the process flow 700. For example, the user computing device 106 may receive the budget plan data at operation 702 via the user interface 112. The user computing device 106 may receive the transaction data from the financial services system 110, the POS device 108, the merchant server 109, etc. The user computing device 106 may update the display 116 of the payment card 102, for example, by sending to the control circuit 115 an instruction to modify the display state of the display 116. In some examples, the user computing device 106 sends budget status data to the control circuit 115 indicating that the control circuit 115 is to change the display state of the display 116.

In some examples, some or all of the operations of the process flow 700 are executed by the financial services system 110. For example, the financial services system 110 may execute operation 706 by providing budget status data to the control circuit 115 of the payment card 102, for example, via the merchant server 109 or POS device 108 and/or directly.

Figure 8:
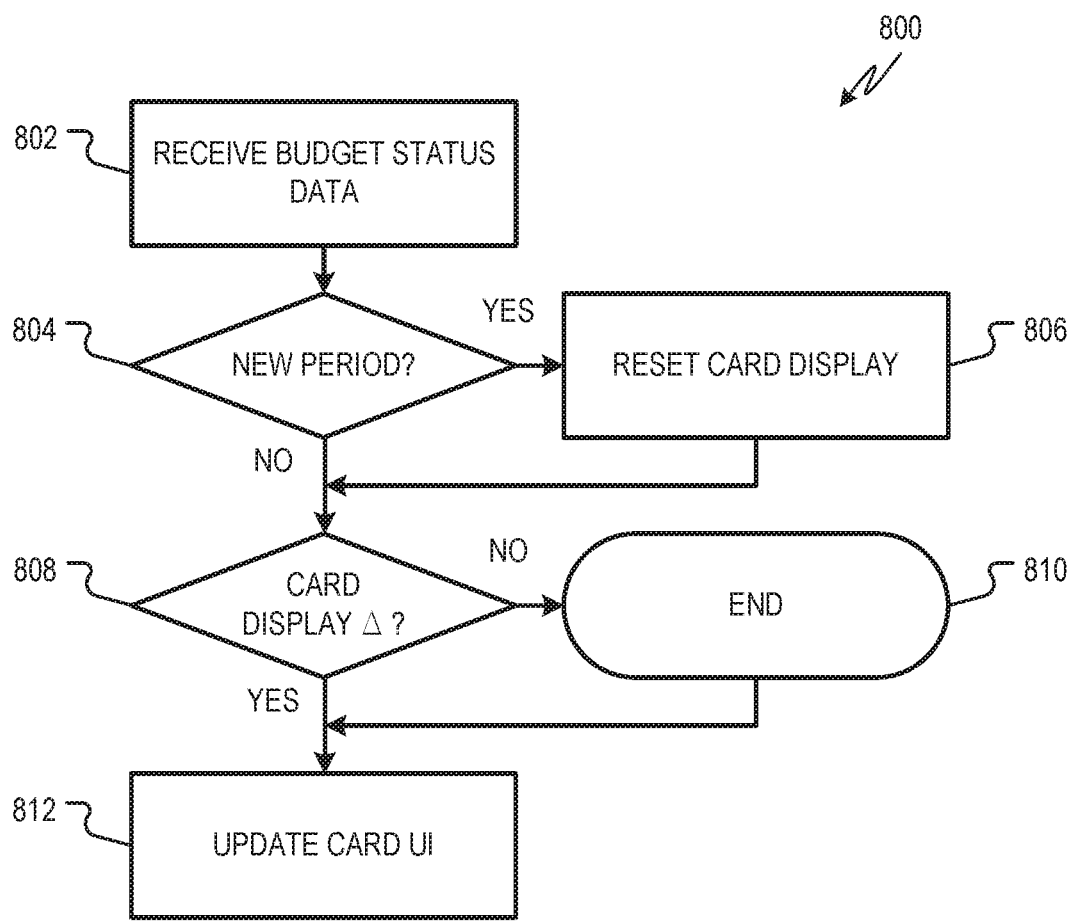
FIG. 8 is a flowchart showing another example of a process flow that may be executed in the environment of FIG. 1 to implement the payment card with budget display.

FIG. 8 is a flowchart showing another example of a process flow 800 that may be executed in the environment 100 of FIG. 1 to implement the payment card 102 with budget display. At operation 802, the payment card 102 (e.g., the control circuit 115 thereof) may receive budget status data. The budget status data may indicate a used portion of a budget amount, an unused portion of the budget amount, or other suitable information indicating a display state. In some examples, the budget status data may indicate a new transaction.

At operation 804, the payment card 102 may determine if a new budget period has begun. A new budget period may have begun if the budget period has changed since a last time that the display 116 was updated (e.g., since a last transaction was made using the payment card 102). If a new budget period has begun, the payment card 102 may reset the display 116 at operation 806. Resetting the display 116 may include configuring the display 116 to a display state that indicates the beginning of a budget period. This may include, for example, changing the color of all or a substantial part of the display 116 to a color indicating that the used portion of the budget amount is zero (or an amount reflecting pre-allocated transactions such as planned bills and expenses). In the examples described in FIGS. 2-4, resetting the display 116 may include shrinking and/or eliminating the budget status shape 202, 302.

After resetting the display 116, or if a new budget period has not begun, the payment card 102 may determine, at operation 808, whether the transaction indicated by the budget status data is consistent with the current display state of the display 116. For example, the payment card 102 may determine whether the transaction has caused the unused portion of the budget amount to decrease below a threshold that would prompt a change in the display state. If the current display state is still consistent with the budget status data, the process flow 800 may conclude at operation 810. If a change is prompted, the control circuit 115 may change the display 116 from a first display state to a second display state at operation 812. This may include, for example, changing a color of all or substantially all of the display 116 or a portion of the display 116, increasing a size of a budget status shape relative to a bounding shape, etc.

Like the process flow 700, some parts of the process flow 800 may, in some examples, be executed by components of the environment 100 other than the payment card 102. For example, the financial services system 110 and/or user computing device 106 may determine if a new budget period has begun (operation 804) and/or determine if the new transaction prompts a change in the display state (operation 808). The financial services system 110 and/or user computing device 106 may then send budget status data to the payment card 102 (e.g., the control circuit 115 thereof) indicating that the payment card 102 should change the display state of the display 116.

Figure 9:
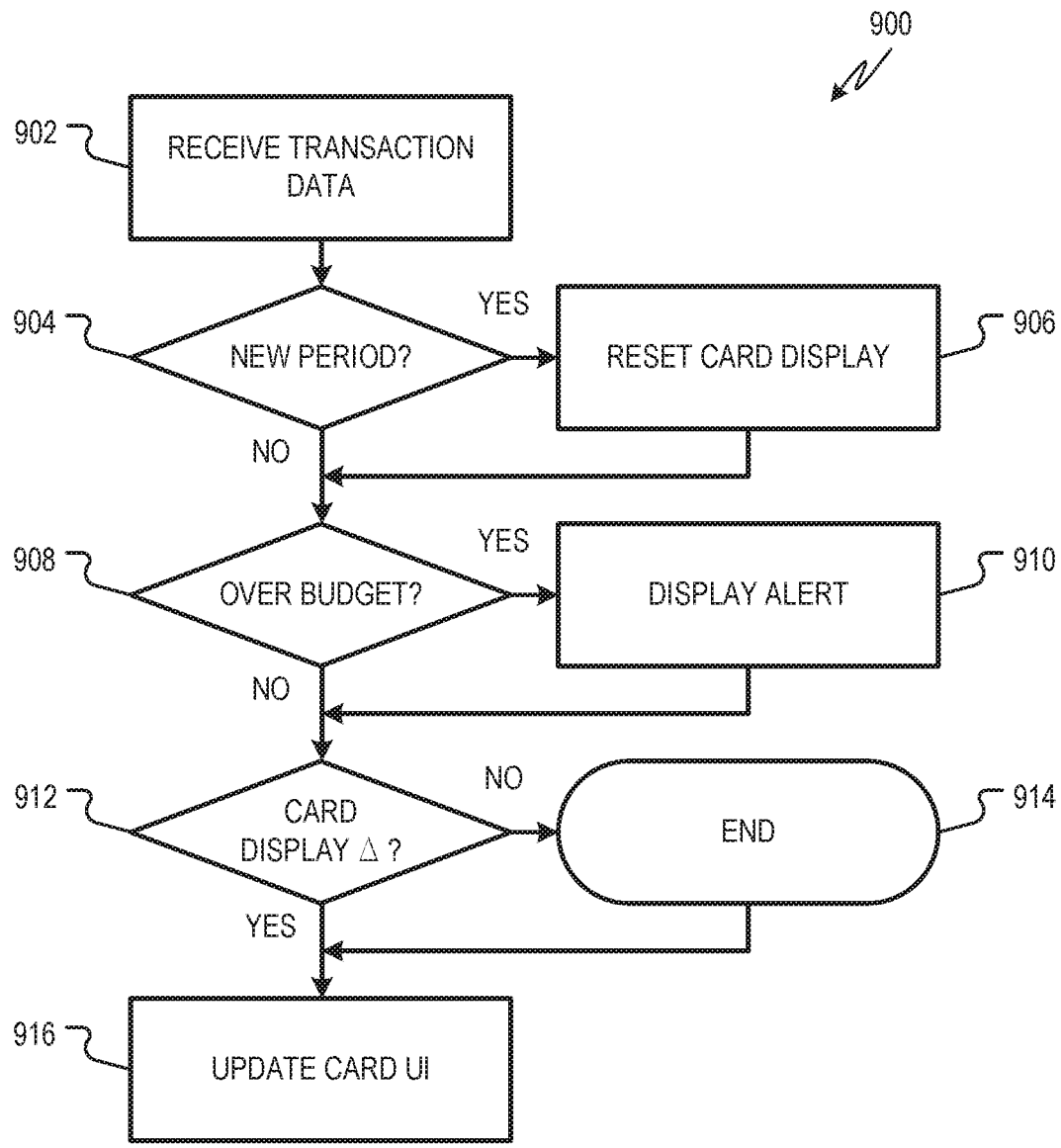
FIG. 9 is a flowchart showing yet another example of a process flow that may be executed in the environment of FIG. 1 to implement the payment card with budget display.

FIG. 9 is a flowchart showing yet another example of a process flow 900 that may be executed in the environment 100 of FIG. 1 to implement the payment card 102 with budget display. The process flow 900 is similar to the process flow 800, but includes additional functionality for alerting the user 104 if spending is over budget. At operation 902, the payment card 102 (e.g., the control circuit 115 thereof) may receive budget status data. The budget status data may indicate a used portion of a budget amount, an unused portion of the budget amount, or other suitable information indicating a display state. In some examples, the budget status data may indicate a new transaction.

At operation 904, the payment card 102 may determine if a new budget period has begun. If a new budget period has begun, the payment card 102 may reset the display 116 at operation 906. After resetting the display 116, or if a new budget period has not begun, the payment card 102 may determine, at operation 908, whether an over-budget condition is present. An over-budget condition may be present, for example, if the budget amount is exceeded (e.g., for the current budget period). The budget amount may be exceeded, for example, if the used portion of the budget amount is greater than or equal to the budget amount. In some examples, the user 104 may also be over the budget if the used portion of the budget amount is greater than an expected amount in view of the current date and/or the current expenses. For example, the budget amount may be exceeded if more than half of a monthly budget amount is used before the end of the month. Also, in some examples, the budget amount may be exceeded if the unused portion of the budget amount is not sufficient to cover expected expenses in the remainder of the budget period (e.g., if there is not a sufficient unused portion of the budget amount to cover a bill due at the end of the month).

If the budget amount is exceeded, the control circuit 115 may modify a display state of the display 116 to indicate the over-budget condition at operation 910. For example, the control circuit 115 may change the color or colors of the display 116 (e.g., to red or another easily noticeable color). In some examples, the control circuit 115 may cause the display 116 to blink or strobe to indicate the over-budget condition. In other examples, the control circuit 115 may cause the display 116 to display an icon or other indicator of the over-budget condition.

At operation 912, the payment card 102 may determine if the budget status data, in view of the transaction, is inconsistent with the display state of the display 116. If the budget status data is still consistent with the current display state, the process flow 900 may conclude at operation 914. If a change is prompted, the control circuit 115 may change the display 116 from a first display state to a second display state at operation 916. This may include, for example, changing a color of all or substantially all of the display 116 or a portion of the display 116, increasing a size of a budget status shape relative to a bounding shape, etc.

Like the process flow 800, some parts of the process flow 900 may, in some examples, be executed by components of the environment 100 other than the payment card 102. For example, the financial services system 110 and/or user computing device 106 may determine if a new period has begun (operation 904), determine whether the budget is exceeded (operation 908), and/or determine if the new transaction prompts a change in the display state (operation 912). The financial services system 110 and/or user computing device 106 may then send budget status data to the payment card 102 (e.g., the control circuit 115 thereof) indicating that the payment card 102 should change the display state of the display 116 to indicate a new transaction, new budget period, and/or an over-budget alert.

Figure 10:
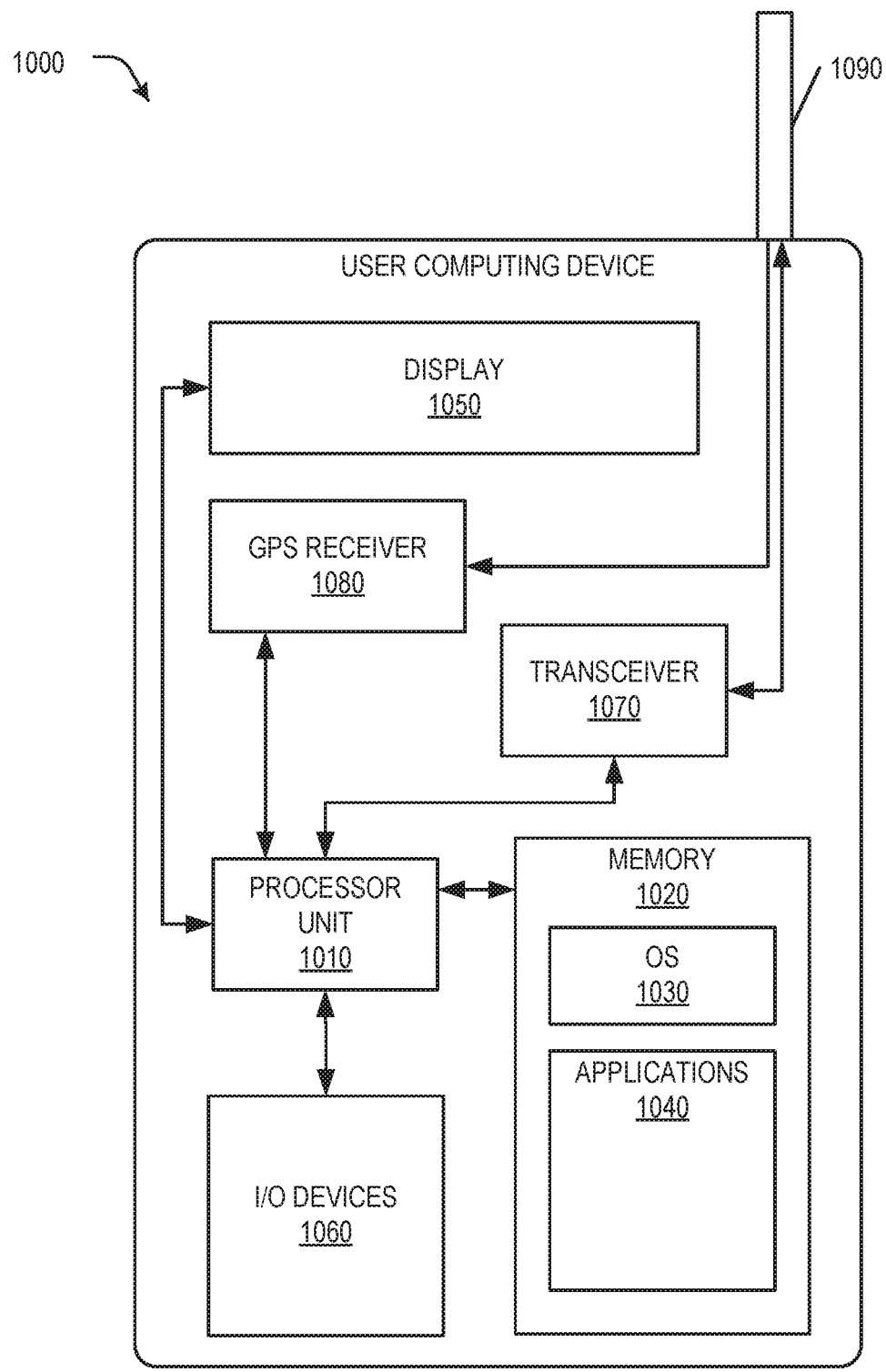
FIG. 10 is a block diagram showing an example architecture of a user computing device.

FIG. 10 is a block diagram showing an example architecture 1000 of a user computing device. The architecture 1000 may, for example, describe any of the computing devices described herein, including, for example, the user computing device 106, POS device 108, merchant server 109, financial services system 110, or control circuit 115. The architecture 1000 comprises a processor unit 1010. The processor unit 1010 may include one or more processors. Any of a variety of different types of commercially available processors suitable for computing devices may be used (for example, an XScale architecture microprocessor, a Microprocessor without Interlocked Pipeline Stages (MIPS) architecture processor, or another type of processor). A memory 1020, such as a Random Access Memory (RAM), a flash memory, or another type of memory or data storage, is typically accessible to the processor unit 1010. The memory 1020 may be adapted to store an operating system (OS) 1030, as well as application programs 1040.

The processor unit 1010 may be coupled, either directly or via appropriate intermediary hardware, to a display 1050 and to one or more input/output (I/O) devices 1060, such as a keypad, a touch panel sensor, a microphone, and the like. Such I/O devices 1060 may include a touch sensor for capturing fingerprint data, a camera for capturing one or more images of the user, a retinal scanner, or any other suitable devices. The I/O devices 1060 may be used to implement I/O channels, as described herein. In some examples, the I/O devices 1060 may also include sensors.

Similarly, in some examples, the processor unit 1010 may be coupled to a transceiver 1070 that interfaces with an antenna 1090. The transceiver 1070 may be configured to both transmit and receive cellular network signals, wireless data signals, or other types of signals via the antenna 1090, depending on the nature of the computing device implemented by the architecture 1000. Although one transceiver 1070 is shown, in some examples, the architecture 1000 includes additional transceivers. For example, a wireless transceiver may be utilized to communicate according to an IEEE 802.11 specification, such as Wi-Fi and/or a short-range communication medium. Some short-range communication mediums, such as NFC, may utilize a separate, dedicated transceiver. Further, in some configurations, a Global Positioning System (GPS) receiver 1080 may also make use of the antenna 1090 to receive GPS signals. In addition to or instead of the GPS receiver 1080, any suitable location-determining sensor may be included and/or used, including, for example, a Wi-Fi positioning system. In some examples, the architecture 1000 (e.g., the processor unit 1010) may also support a hardware interrupt. In response to a hardware interrupt, the processor unit 1010 may pause its processing and execute an interrupt service routine (ISR).

Figure 11:
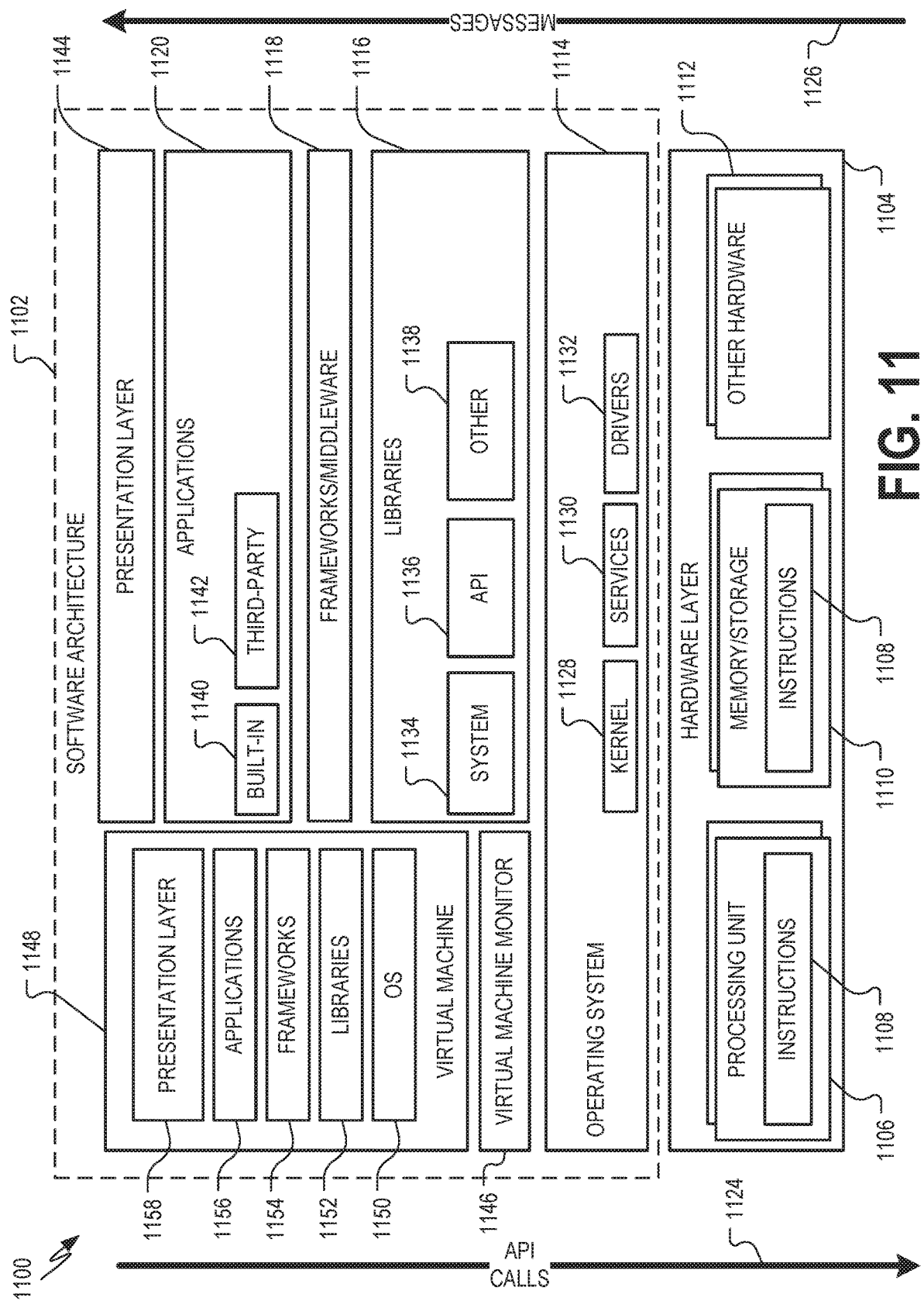
FIG. 11 is a block diagram showing one example of a software architecture for a computing device.

FIG. 11 is a block diagram 1100 showing one example of a software architecture 1102 for a computing device. The software architecture 1102 may be used in conjunction with various hardware architectures, for example, as described herein. FIG. 11 is merely a non-limiting example of a software architecture 1102, and many other architectures may be implemented to facilitate the functionality described herein. A representative hardware layer 1104 is illustrated and can represent, for example, any of the above-referenced computing devices. In some examples, the hardware layer 1104 may be implemented according to an architecture 1200 of FIG. 12 and/or the architecture 1000 of FIG. 10.

The representative hardware layer 1104 comprises one or more processing units 1106 having associated executable instructions 1108. The executable instructions 1108 represent the executable instructions of the software architecture 1102, including implementation of the methods, modules, components, and so forth of FIGS. 1-9. The hardware layer 1104 also includes memory and/or storage modules 1110, which also have the executable instructions 1108. The hardware layer 1104 may also comprise other hardware 1112, which represents any other hardware of the hardware layer 1104, such as the other hardware illustrated as part of the architecture 1200.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120, and a presentation layer 1144. Operationally, the applications 1120 and/or other components within the layers may invoke application programming interface (API) calls 1124 through the software stack and receive a response, returned values, and so forth illustrated as messages 1126 in response to the API calls 1124. The layers illustrated are representative in nature and not all software architectures have all layers. For example, some mobile or special-purpose operating systems may not provide a frameworks/middleware 1118 layer, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. In some examples, the services 1130 include an interrupt service. The interrupt service may detect the receipt of a hardware or software interrupt and, in response, cause the software architecture 1102 to pause its current processing and execute an ISR when an interrupt is received. The ISR may generate an alert.

The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than by interfacing directly with the underlying operating system 1114 functionality (e.g., kernel 1128, services 1130, and/or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks 1118 (also sometimes referred to as middleware) may provide a higher-level common infrastructure that may be utilized by the applications 1120 and/or other software components/modules. For example, the frameworks 1118 may provide various graphical user interface (GUI) functions, high-level resource management, high-level location services, and so forth. The frameworks 1118 may provide a broad spectrum of other APIs that may be utilized by the applications 1120 and/or other software components/modules, some of which may be specific to a particular operating system or platform.

The applications 1120 include built-in applications 1140 and/or third-party applications 1142. Examples of representative built-in applications 1140 may include, but are not limited to, a contacts application, a browser application, a book reader application, a location application, a media application, a messaging application, and/or a game application. The third-party applications 1142 may include any of the built-in applications 1140 as well as a broad assortment of other applications. In a specific example, the third-party application 1142 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 1142 may invoke the API calls 1124 provided by the mobile operating system such as the operating system 1114 to facilitate functionality described herein.

The applications 1120 may utilize built-in operating system functions (e.g., kernel 1128, services 1130, and/or drivers 1132), libraries (e.g., system libraries 1134, API libraries 1136, and other libraries 1138), or frameworks/middleware 1118 to create user interfaces to interact with users of the system. Alternatively, or additionally, in some systems, interactions with a user may occur through a presentation layer, such as the presentation layer 1144. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 11, this is illustrated by a virtual machine 1148. A virtual machine creates a software environment where applications/modules can execute as if they were executing on a hardware computing device. The virtual machine 1148 is hosted by a host operating system (e.g., the operating system 1114) and typically, although not always, has a virtual machine monitor 1146, which manages the operation of the virtual machine 1148 as well as the interface with the host operating system (e.g., the operating system 1114). A software architecture executes within the virtual machine 1148, such as an operating system 1150, libraries 1152, frameworks/middleware 1154, applications 1156, and/or a presentation layer 1158. These layers of software architecture executing within the virtual machine 1148 can be the same as corresponding layers previously described or may be different.

Figure 12:
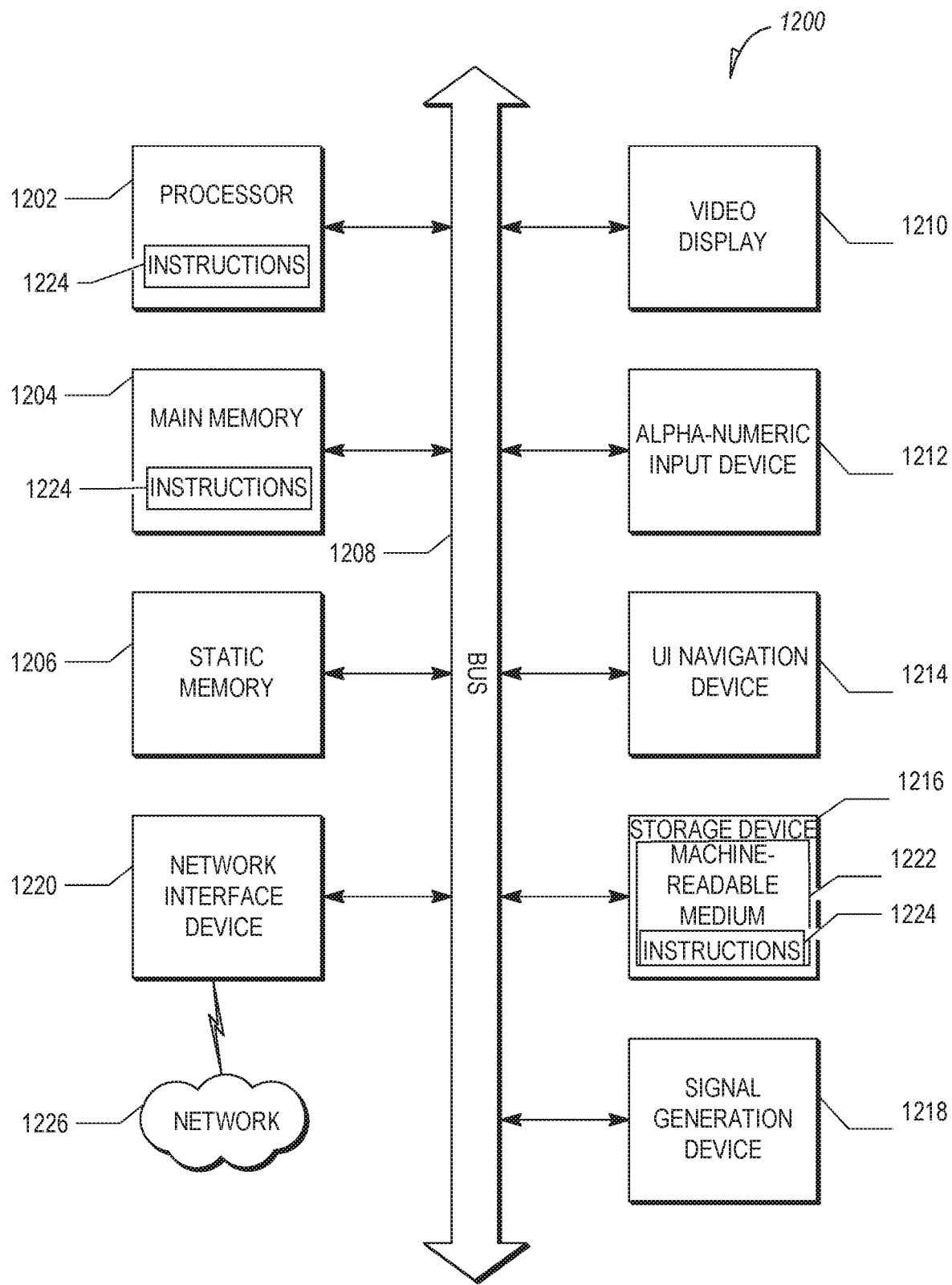
FIG. 12 is a block diagram illustrating a computing device hardware architecture, within which a set or sequence of instructions can be executed to cause a machine to perform examples of any one of the methodologies discussed herein.

FIG. 12 is a block diagram illustrating a computing device hardware architecture 1200, within which a set or sequence of instructions can be executed to cause a machine to perform examples of any one of the methodologies discussed herein. The architecture 1200 may describe, for example, any of the computing devices and/or control circuits described herein. The architecture 1200 may execute the software architecture 1102 described with respect to FIG. 11. The architecture 1200 may operate as a standalone device or may be connected (e.g., networked) to other machines. In a networked deployment, the architecture 1200 may operate in the capacity of either a server or a client machine in server-client network environments, or it may act as a peer machine in peer-to-peer (or distributed) network environments. The architecture 1200 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 1200 includes a processor unit 1202 comprising at least one processor (e.g., a central processing unit (CPU), a graphics processing unit (GPU), or both, processor cores, compute nodes, etc.). The architecture 1200 may further comprise a main memory 1204 and a static memory 1206, which communicate with each other via a link 1208 (e.g., a bus). The architecture 1200 can further include a video display unit 1210, an alphanumeric input device 1212 (e.g., a keyboard), and a UI navigation device 1214 (e.g., a mouse). In some examples, the video display unit 1210, alphanumeric input device 1212, and UI navigation device 1214 are incorporated into a touchscreen display. The architecture 1200 may additionally include a storage device 1216 (e.g., a drive unit), a signal generation device 1218 (e.g., a speaker), a network interface device 1220, and one or more sensors (not shown), such as a GPS sensor, compass, accelerometer, or other sensor.

In some examples, the processor unit 1202 or another suitable hardware component may support a hardware interrupt. In response to a hardware interrupt, the processor unit 1202 may pause its processing and execute an ISR, for example, as described herein.

The storage device 1216 includes a machine-readable medium 1222 on which is stored one or more sets of data structures and instructions 1224 (e.g., software) embodying or utilized by any one or more of the methodologies or functions described herein. The instructions 1224 can also reside, completely or at least partially, within the main memory 1204, within the static memory 1206, and/or within the processor unit 1202 during execution thereof by the architecture 1200, with the main memory 1204, the static memory 1206, and the processor unit 1202 also constituting machine-readable media. The instructions 1224 stored at the machine-readable medium 1222 may include, for example, instructions for implementing the software architecture 1102, instructions for executing any of the features described herein, etc.

While the machine-readable medium 1222 is illustrated in an example to be a single medium, the term "machine-readable medium" can include a single medium or multiple media (e.g., a centralized or distributed database, and/or associated caches and servers) that store the one or more instructions 1224. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM) and electrically erasable programmable read-only memory (EEPROM)) and flash memory devices; magnetic disks such as internal hard disks and removable disks; magneto-optical disks; and CD-ROM and DVD-ROM disks.

The instructions 1224 can further be transmitted or received over a communications network 1226 using a transmission medium via the network interface device 1220 utilizing any one of a number of well-known transfer protocols (e.g., hypertext transfer protocol (HTTP)). Examples of communication networks include a LAN, a WAN, the Internet, mobile telephone networks, plain old telephone service (POTS) networks, and wireless data networks (e.g., 3G, and 5G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as embodiments can feature a subset of said features. Further, embodiments can include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:

1. A payment card comprising:
   a display; and
   a control circuit, configured to perform operations comprising:
   displaying, at the display, a first display state indicating a first unused portion of a budget amount for a current budget period, wherein, in the first display state, the display shows a budget status shape having a first area, a second area, and a third area, the first area indicating a first used portion of the budget amount for the current budget period in a first color, the second area indicating a second used portion of the budget amount for the current budget period in a second color, and the third area indicating the first unused portion of the budget amount for the current budget period;
   displaying a date indicator, overlaid on at least a portion of the first area on the display, indicating an end of the current budget period;
   accessing, at the payment card, first budget status data generated in response to a transaction made with the payment card; and
   changing the display to display a second display state indicating a second unused portion of the budget amount for the current budget period, wherein the second unused portion is based at least in part on the transaction, wherein, in the second display state, the display shows a modified budget status shape where the second area has increased, and the third area has decreased compared to the first display state, wherein the third area in the second display state corresponds to the second unused portion.

2. The payment card of claim 1, wherein the control circuit is further configured to perform operations comprising determining that the first budget status data is inconsistent with the first display state.

3. The payment card of claim 1, wherein the control circuit is further configured to perform operations comprising determining, based at least in part on the first budget status data, that the transaction exceeds the budget amount, wherein the second display state indicates an over-budget condition.

4. The payment card of claim 1, wherein the first budget status data indicates that the transaction exceeds the budget amount, and wherein the second display state indicates an over-budget condition.

5. The payment card of claim 1, wherein the display is substantially a first color in the first display state and is substantially a second color in the second display state.

6. The payment card of claim 1, wherein the second display state comprises a modified budget status shape positioned inside a bounding shape, wherein the modified budget status shape is shorter than the budget status shape in a first dimension.

7. The payment card of claim 6, wherein the budget status shape comprises:
   a first shape portion having a first color; and
   a second shape portion having a second color, the second shape portion being adjacent to the first shape portion along the first dimension.

8. The payment card of claim 1, wherein, in the second display state, the display indicates a category indicator describing categories of transactions during the current budget period.

9. The payment card of claim 1, wherein the first area, the second area, and the third area are arranged sequentially in the display.

10. The payment card of claim 1, wherein the second display state includes a fourth area indicating a third used portion of the budget amount for the current budget period in a third color.

11. A method of interfacing a payment card to a user, the method comprising:
    displaying, at the display, a first display state indicating a first unused portion of a budget amount for a current budget period, wherein, in the first display state, the display shows a budget status shape having a first area, a second area and a third area, the first area indicating a first used portion of the budget amount for the current budget period in a first color, the second area indicating a second used portion of the budget amount for the current budget period in a second color, and the third area indicating the first unused portion of the budget amount for the current budget period;
    displaying a date indicator, at the display of the payment card overlaid on at least a portion of the first area, indicating an end of the current budget period;
    accessing, at the payment card, first budget status data generated in response to a transaction made with the payment card; and
    changing the display of the payment card to display a second display state indicating a second unused portion of the budget amount for the current budget period, wherein the second unused portion is based at least in part on the transaction, wherein, in the second display state, the display shows a modified budget status shape where the second area has increased, and the third area has decreased compared to the first display state, wherein the third area in the second display state corresponds to the second unused portion.

12. The method of claim 11, further comprising determining that the first budget status data is inconsistent with the first display state.

13. The method of claim 11, further comprising determining, based at least in part on the first budget status data, that the transaction exceeds the budget amount, wherein the second display state indicates an over-budget condition.

14. The method of claim 11, wherein the first budget status data indicates that the transaction exceeds the budget amount, and wherein the second display state indicates an over-budget condition.

15. The method of claim 11, wherein the display is substantially a first color in the first display state and is substantially a second color in the second display state.

16. The method of claim 11, wherein the budget status shape comprises:

a first shape portion having a first color; and a second shape portion having a second color, the second shape portion being adjacent to the first shape portion along a first dimension.

17. The method of claim 11, wherein, in the second display state, the display indicates a category indicator describing categories of transactions during the current budget period.

18. A machine-readable medium comprising instructions thereon that, when executed by at least one processor unit, cause the processor unit to perform operations comprising:

displaying, at a display of a payment card, a first display state indicating a first unused portion of a budget amount for a current budget period, wherein, in the first display state, the display shows a budget status shape having a first area, a second area, and a third area, the first area indicating a first used portion of the budget amount for the current budget period in a first color, the second area indicating a second used portion of the budget amount for the current budget period in a second color, and the third area indicating the first unused portion of the budget amount for the current budget period;

displaying a date indicator, at the display of the payment card overlaid on at least a portion of the first area, indicating an end of the current budget period;

accessing, at the payment card, first budget status data generated in response to a transaction made with the payment card; and changing the display of the payment card to display a second display state indicating a second unused portion of the budget amount for the current budget period, wherein the second unused portion is based at least in part on the transaction, wherein, in the second display state, the display shows a modified budget status shape where the second area has increased, and the third area has decreased compared to the first display state, wherein the third area in the second display state corresponds to the second unused portion.

* * * * *

UNITED STATES PATENT AND TRADEMARK OFFICE
CERTIFICATE OF CORRECTION

PATENT NO. : 10,671,995 B1
APPLICATION NO. : 15/809504
DATED : June 2, 2020
INVENTOR(S) : Cote et al.

Page 1 of 1

It is certified that error appears in the above-identified patent and that said Letters Patent is hereby corrected as shown below:

In the Claims

Column 16, Line 29, in Claim 11, delete "area" and insert --area,-- therefor

Signed and Sealed this
Eighth Day of December, 2020

Andrei Iancu
*Director of the United States Patent and Trademark Office*